(12) United States Patent
Mathie et al.

(10) Patent No.: US 10,461,343 B2
(45) Date of Patent: Oct. 29, 2019

(54) FUEL CELL ASSEMBLY WITH COOLING SYSTEM

(71) Applicant: Ford Global Technologies, LLC, Dearborn, MI (US)

(72) Inventors: Craig Michael Mathie, White Lake Twp., MI (US); Michael Allen DeBolt, Saline, MI (US); Brian Gillespey, Gregory, MI (US); William F. Sanderson, Commerce Township, MI (US); Zijie Lu, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1152 days.

(21) Appl. No.: 14/619,717

(22) Filed: Feb. 11, 2015

(65) Prior Publication Data
US 2016/0233530 A1 Aug. 11, 2016

(51) Int. Cl.
*H01M 8/04* (2016.01)
*H01M 8/04007* (2016.01)
(Continued)

(52) U.S. Cl.
CPC ......... *H01M 8/04074* (2013.01); *B60L 58/30* (2019.02); *B60L 58/32* (2019.02); *H01M 8/0267* (2013.01); *H01M 8/04029* (2013.01); *H01M 8/04358* (2013.01); *H01M 8/04723* (2013.01); *H01M 8/04768* (2013.01); *H01M 8/2483* (2016.02); *H01M 2008/1095* (2013.01); *H01M 2250/20* (2013.01); *Y02T 90/32* (2013.01); *Y02T 90/34* (2013.01)

(58) Field of Classification Search
CPC ........... H01M 8/04074; H01M 8/0267; H01M 8/0258; H01M 8/0265; H01M 8/2483; H01M 8/04029; H01M 8/04723; H01M 2008/1095; H01M 2250/20; H01M 8/04768; H01M 8/04358; B60L 58/32; B60L 58/30; Y02T 90/34; Y02T 90/32
See application file for complete search history.

(56) References Cited

U.S. PATENT DOCUMENTS 6,329,089 B1 12/2001 Roberts et al.
7,749,632 B2 7/2010 Zhang et al.
(Continued)

FOREIGN PATENT DOCUMENTS

JP 2004063118 A * 2/2004

OTHER PUBLICATIONS

English translation of JP 2004063118 A, retrieved on Mar. 21, 2017.*

*Primary Examiner* — Milton I Cano
*Assistant Examiner* — Philip A. Stuckey
(74) *Attorney, Agent, or Firm* — David Kelley; Brooks Kushman P.C.

(57) ABSTRACT

A fuel cell assembly includes a fuel cell arrangement having first and second plates sandwiching a membrane electrode assembly. The arrangement defines first and second header regions that each include supply and return headers. The first plate defines coolant channels that extend between the header regions and connect to the return header in the first region. The second plate defines coolant channels that extend between the header regions and connect to the supply header in the first region.

16 Claims, 5 Drawing Sheets

(51) Int. Cl.

| | | |
|---|---|---|
| *H01M 8/0267* | (2016.01) | |
| *H01M 8/04029* | (2016.01) | |
| *H01M 8/0432* | (2016.01) | |
| *H01M 8/04701* | (2016.01) | |
| *H01M 8/04746* | (2016.01) | |
| *H01M 8/2483* | (2016.01) | |
| *B60L 58/30* | (2019.01) | |
| *B60L 58/32* | (2019.01) | |
| *H01M 8/1018* | (2016.01) | |

(56) References Cited

U.S. PATENT DOCUMENTS

| | | | |
|---|---|---|---|
| 7,759,010 B2 | 7/2010 | Hoch et al. | |
| 8,603,654 B2 | 12/2013 | Cartwright et al. | |
| 2003/0039877 A1* | 2/2003 | Dufner | H01M 8/0221 |
| | | | 429/429 |
| 2007/0287045 A1* | 12/2007 | Lee | H01M 8/0267 |
| | | | 429/435 |
| 2008/0113254 A1* | 5/2008 | Christie | H01M 8/0258 |
| | | | 429/444 |
| 2011/0070511 A1 | 3/2011 | Nelson et al. | |
| 2011/0159393 A1 | 6/2011 | Takemoto et al. | |
| 2011/0189555 A1 | 8/2011 | Baur et al. | |
| 2012/0028156 A1* | 2/2012 | Song | H01M 8/04007 |
| | | | 429/437 |
| 2012/0219875 A1* | 8/2012 | Hasegawa | H01M 8/026 |
| | | | 429/480 |
| 2013/0196241 A1 | 8/2013 | Woolliams et al. | |
| 2014/0234743 A1* | 8/2014 | Sasamoto | H01M 8/04089 |
| | | | 429/456 |
| 2014/0356748 A1* | 12/2014 | Yamazaki | H01M 8/04074 |
| | | | 429/435 |

* cited by examiner

FUEL CELL ASSEMBLY WITH COOLING SYSTEM

TECHNICAL FIELD

The present disclosure relates to fuel cells for automotive vehicles and specifically to fuel cells having cooling systems.

BACKGROUND

Concerns about environmental pollution and fossil fuel depletion have increased demand for alternative clean energy solutions. The hydrogen fuel cell, and in particular the proton exchange membrane fuel cell (PEMFC), is one potential power source for future automobiles and stationary applications. The reaction in a PEMFC involves hydrogen molecules splitting into hydrogen ions and electrons at the anode, while protons re-combine with oxygen and electrons to form water and release heat at the cathode. Typically, a proton exchange membrane is used as a proton conductor in a PEMFC. A catalyst layer containing, for example, platinum and/or a platinum alloy is used to catalyze the electrode reactions. A gas diffusion layer, which may include a microporous layer and a carbon fiber based gas diffusion backing layer, is used to transport reactant gases and electrons as well as remove product water and heat. In addition, a flow field plate is generally used to distribute the reactant gases.

Excessively cold or hot fuel cell temperatures may affect the membrane and other materials in the stack. Fuel cell systems typically include thermal management systems to control the temperature of the fuel cell stack within a desired temperature range.

SUMMARY

According to one embodiment of the present disclosure, a fuel cell assembly includes a fuel cell arrangement having first and second plates sandwiching a membrane electrode assembly. The arrangement defines first and second header regions that each include supply and return headers. The first plate defines coolant channels that extend between the header regions and connect to the return header in the first region. The second plate defines coolant channels that extend between the header regions and connect to the supply header in the first region.

According to another embodiment of the present disclosure, a fuel cell assembly includes a membrane electrode assembly sandwiched between first and second plates that each have opposing first and second regions that each define a first coolant header and a second coolant header. In response to the assembly being in cold-start mode, the first plate is configured to circulate coolant from the first region to the second region and the second plate is configured to circulate coolant from the second region to the first region.

According to yet another embodiment of the present disclosure, a vehicle includes a reservoir, a fuel cell stack, a manifold, and at least one controller. The reservoir has coolant and a coolant temperature sensor. The fuel cell stack has first and second header regions that each define a pair of headers configured to circulate the coolant across a length of the stack. The manifold is disposed on an end of the stack and is connected to each of the headers. The manifold includes valves for controlling a flow direction of the coolant in each of the headers. The at least one controller is in electronic communication with the valves and the temperature sensor. The controller is programmed to, in response to the coolant having a temperature below a threshold value, command actuation of the valves such that the pair of headers in the first header region circulate the coolant in opposite directions.

DETAILED DESCRIPTION

Figure 1:
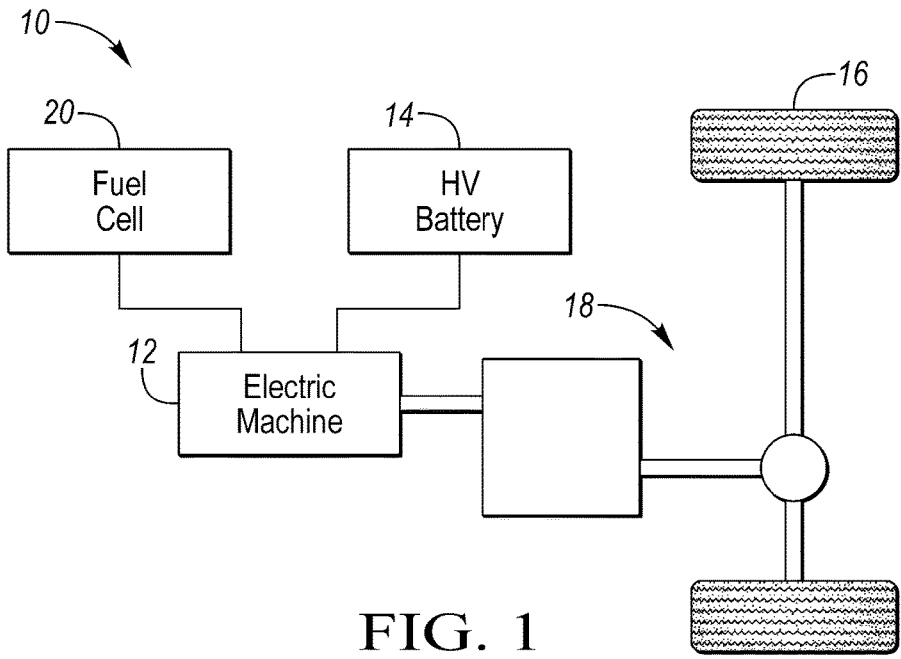
FIG. 1 is a schematic of a fuel cell vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

PEMFC are a popular fuel cell choice for automotive vehicles. The PEMFC generally includes a proton exchange membrane (PEM). The anode and the cathode typically include finely divided catalytic particles, usually platinum, supported on carbon particles and mixed with an ionomer. The catalytic mixture is deposited on opposing sides of the membrane. The combination of the anode catalytic mixture, the cathode catalytic mixture and the PEM define a membrane electrode assembly (MEA). In order to facilitate the transport of reactant gases to and remove the excessive water and heat from the catalytic mixture, a gas diffusion layer (GDL), which may include a microporous layer and a carbon fiber based gas diffusion backing layer, is applied on either side of the MEA. GDLs also provide mechanical support for the soft goods including the PEM and catalytic mixtures.

MEAs are sandwiched between bipolar plates to form individual fuel cells. The bipolar plates typically include an anode side and a cathode side. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. Coolant channels may be disposed between the anode and cathode sides of the bipolar plates to provide heat transfer functionality to the fuel cell.

Several fuel cells are typically combined in a fuel cell stack to generate the desired power. For example, the stack may include 200 or more fuel cells arranged in series. The fuel cell stack receives a cathode reacting gas, typically a flow of air forced through the stack by a compressor. Not all the oxygen is consumed by the stack and some of the air is output as a cathode exhaust gas that may include water as a stack byproduct. The fuel cell stack also receives an anode hydrogen reacting gas that flows into the anode side of the stack.

Referring to FIG. 1, a vehicle 10 includes a fuel cell stack 20 for providing electrical power to at least one electric machine 12. The vehicle 10 may also include a traction battery 14 electrically connected to the fuel cell stack 20 and the electric machine 12. The electric machine 12 is connected to the driven wheels 16 via a drivetrain 18. During operation of the vehicle 10, hydrogen fuel and air are fed into the fuel cell stack 20 creating electrical power. The electric machine 12 receives the electrical power as an input, and outputs torque for driving the wheels 16 to propel the vehicle 10.

Figure 2:
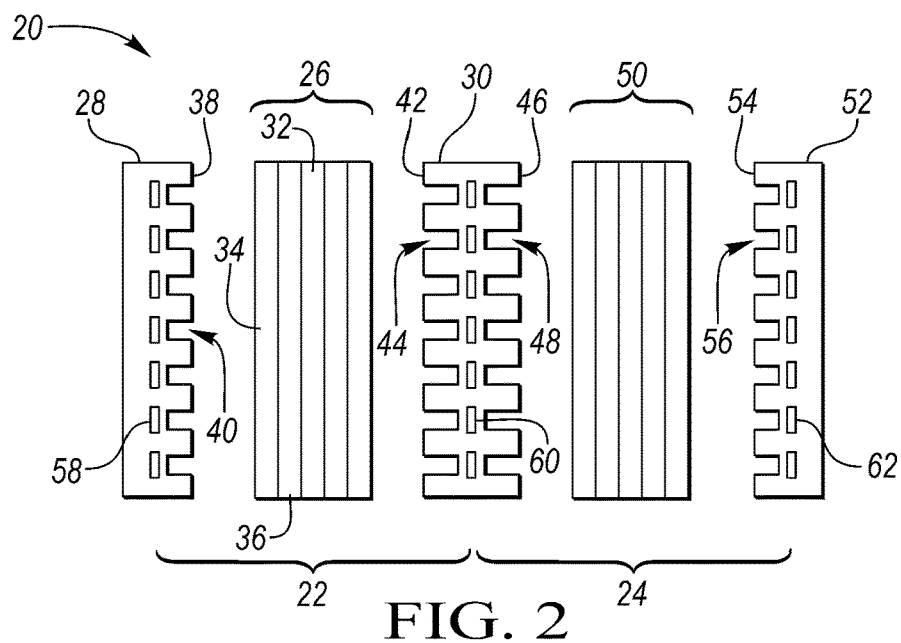
FIG. 2 is an exploded view of a proton exchange membrane fuel cell stack.

Referring to FIG. 2, an example fuel cell stack 20 includes two cells 22, 24 stacked together. The two cell stack is merely an example and the cell stack 20 may include tens or hundreds of stacked cells. The first cell 22 includes an MEA 26 sandwiched between the first end plate 28 and a bipolar plate 30. The MEA 26 is comprised of a plurality of different layers including a PEM 32, a pair of gas diffusion layers (GDL) 34 and a pair of catalyst layers 36. The endplate 28 includes an anode facing side 38 defining a plurality of flow paths 40 for the hydrogen fuel. The bipolar plate 30 includes a cathode facing side 42 defining a plurality of flow paths 44 for air, and an anode facing side 46 defining a plurality of flow paths 48 for hydrogen fuel. A second MEA 50 is sandwiched between the bipolar plate 30 and a last endplate 52. The last endplate 52 includes a cathode side 54 defining a plurality of flow paths 56 for air.

Each of the first and second fuel cells 22, 24 may include coolant channels defined in the endplates, bipolar plates and/or the MEA. In the illustrated example, the first endplate 28 includes first coolant channels 58, the bipolar plate 30 includes second coolant channels 60 and the last endplate includes third coolant channels 62. Each of the coolant channels extend along a length of the corresponding plate. The coolant channels are configured to circulate a fluid or coolant, such as ethylene glycol, within the channels.

The stack 20 may include a plurality of cooling modes having different flow directions within the coolant channels. For example, the stack may have a normal mode where the coolant is generally circulated from the top to the bottom of each plate. The stack may also have a cold start mode where adjacent plates of the fuel cell stack 20 have alternating directions of flow within the cooling channels 58, 60. For example, the first cooling channels 58 circulate coolant into the page, the second cooling channels 60 circulate coolant out of the page, and the third cooling channels 62 circulate coolant into the page. Alternating the direction of coolant flow within the channels helps to reduce hot and cold spots, and provide a more uniform temperature along the length of the cell.

This is especially useful during cold start, where the temperature of the coolant may be below −25 degrees Celsius (C). During cold start, the temperature of the coolant at the inlet of each coolant channel is below the freezing temperature of water and can freeze the fresh product water generated by the stack during operation. Ice formation within the fuel cell has a quenching effect on the current production of the cells, and in extreme cases can cause the fuel cell system to shut down. The coolant temperature near the outlet is significantly higher than the inlet. In some cases, the temperature differential between the inlet and outlet can be 70 degrees C. or greater. If the direction of coolant flow within adjacent plates is alternated such that the coolant inlet of one plate is adjacent to the coolant outlet of its neighboring plates, the hotter outlets will radiate heat to the colder inlets of their neighbors, reducing the formation of ice as well as the quenching effect on cell current production.

Figure 3:
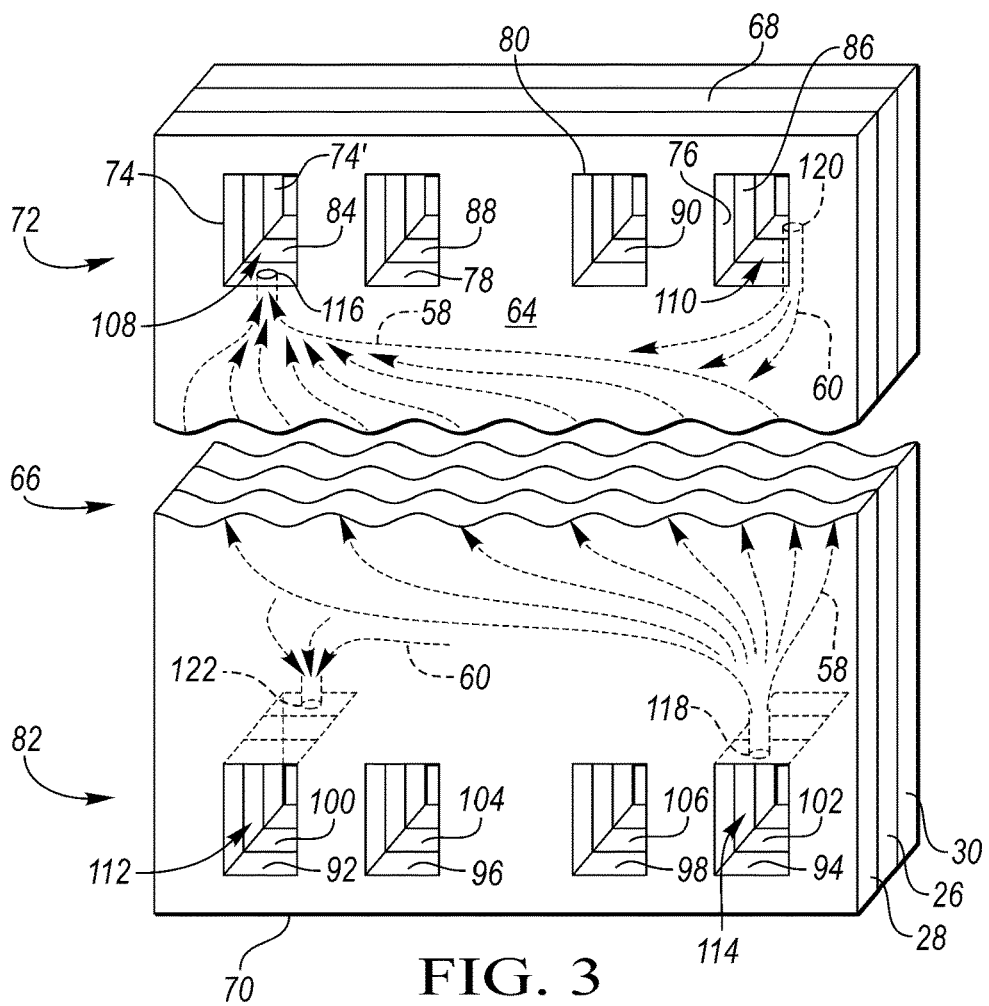
FIG. 3 is a perspective view of a portion of the fuel cell stack.

Referring to FIG. 3, a front perspective view of a portion of the fuel cell stack 20 is illustrated. The stack 20 includes a top 68 and a bottom 70. An upper header region 72 of the stack 20 is located near the top 68 and a lower header region 82 is located near the bottom 70. The header regions are the areas of the stack where the coolant, hydrogen and oxygen headers are located. Within the upper header region 72, each of the plates 28, 30 defines a first cooling port 74, a second cooling port 76, a hydrogen port 78, and an air port 80. The MEA 26 also defines a first cooling port 84, a second cooling port 86, a hydrogen port 88, and an air port 90 within the upper header region 72. Within the lower header region 82, each of the plates 28, 30 define a third coolant port 92, a fourth coolant port 94, a hydrogen port 96, and an air port 98. The MEA 26 also defines a third cooling port 100, a fourth cooling port 102, a hydrogen port 104, and an air port 106.

The first coolant ports (such as 74) cooperate with neighboring first coolant ports (such as 84) to define a first coolant header 108 extending through the stack 20 in the upper header region 72. The second coolant ports (such as 76) cooperate with neighboring second coolant ports (such as 86) to define a second coolant header 110 extending through the stack 20 in the upper header region 72. The third coolant ports (such as 92) cooperate with neighboring third coolant ports (such as 100) to define a third coolant header 112 extending through the stack 20 in the lower header region 82. The fourth coolant ports (such as 94) cooperate with neighboring fourth coolant ports (such as 102) to define a fourth coolant header 114 extending through the stack 20 in the lower header region 82.

The direction of flow within each of the coolant headers is reversible such that any of the headers may be a supply header or a return header depending upon operating modes. A manifold or other device is connected with the headers to control the direction of flow within each of the headers in order to switch the direction of flow during different operating modes. In any given operating mode, two of the headers may flow in one direction and the other two headers may flow in a reverse direction.

The hydrogen ports cooperate with neighboring hydrogen ports to define hydrogen supply and exhaust headers that extend through the stack 20. The hydrogen supply and exhaust headers are in fluid communication with flow paths (such as flow paths 40 and 48 in FIG. 2) to provide fuel to each of the cells in the stack 20. Similarly, the air ports cooperate with neighboring air ports to define air supply and exhaust headers that extend through the stack 20. The air supply and exhaust headers are in fluid communication with flow paths (such as flow paths 44 and 56 in FIG. 2) to provide oxygen to the cells.

Each of the plates 28, 30 includes respective coolant channels 58, 60 defined within an interior of the plate. For example, coolant channel 58 is disposed within plate 28 and coolant channel 60 is disposed within plate 30. The coolant channels 58, 60 extend between the upper and lower header regions 72, 82. Each of the cooling channels 58, 60 are in fluid communication with one of the headers in the upper region 72 and with one of the headers in the lower region 82 via an opening or port. In one embodiment, the coolant channel 58 is connected to the first header 108 via an opening 116 and is connected to the fourth header 114 via an opening 118. The cooling channel 60 is connected to the second header 110 via an opening 120 and is connected to the third header 112 via an opening 122. For each header region, only one of the adjacent plates includes an inlet/outlet opening. For example, port 74 of plate 28 includes opening 116 and port 74' of plate 30 does include an opening. Thus, coolant flowing within header 108 can enter/exit plate 28, but cannot enter/exit plate 30. This arrangement allows the coolant channels of adjacent plates to have alternating flow directions.

The flow direction within the coolant channels is determined by the flow direction of the coolant headers with which it is in fluid communication. For example, in the cold start mode, the first and third headers 108, 112 are return headers and the second and fourth headers 110, 114 are supply headers. The return headers may have a flow direction into the page and the supply headers may have a flow direction out of the page. Here, the cooling channels 58 have a generally upward flow direction and circulate fluid from the lower header region 82 to the upper header region 72. The cooling channels 60 have a generally downward flow direction and circulate fluid from the upper header region 72 to the lower header region 82. The coolant channels 58 and 60 generally flow in alternating directions to arrange the hotter coolant exit regions of one cell adjacent to the cooler coolant inlet regions of the neighboring cell to promote better thermal equilibrium between the cells and minimize hot and cold spots. While this alternating coolant flow arrangement is described as cold start mode, it is to be appreciated that the alternating coolant flow arrangement can be utilized other than during a cold start of the vehicle.

In another operating mode, the first and second headers 108, 110 are supply headers and the third and fourth headers 112, 114 are return headers. The supply headers may have a flow direction out of the page and the return headers may have a flow direction into the page. Here, the cooling channels 58 have a generally downward flow direction and circulate coolant from the upper header region 72 to the lower header region 82. The cooling channels 60 also circulate coolant from the upper header region 72 to the lower header region 82. This cooling arrangement can be utilized for most operating modes of a fuel cell stack.

Figure 4:
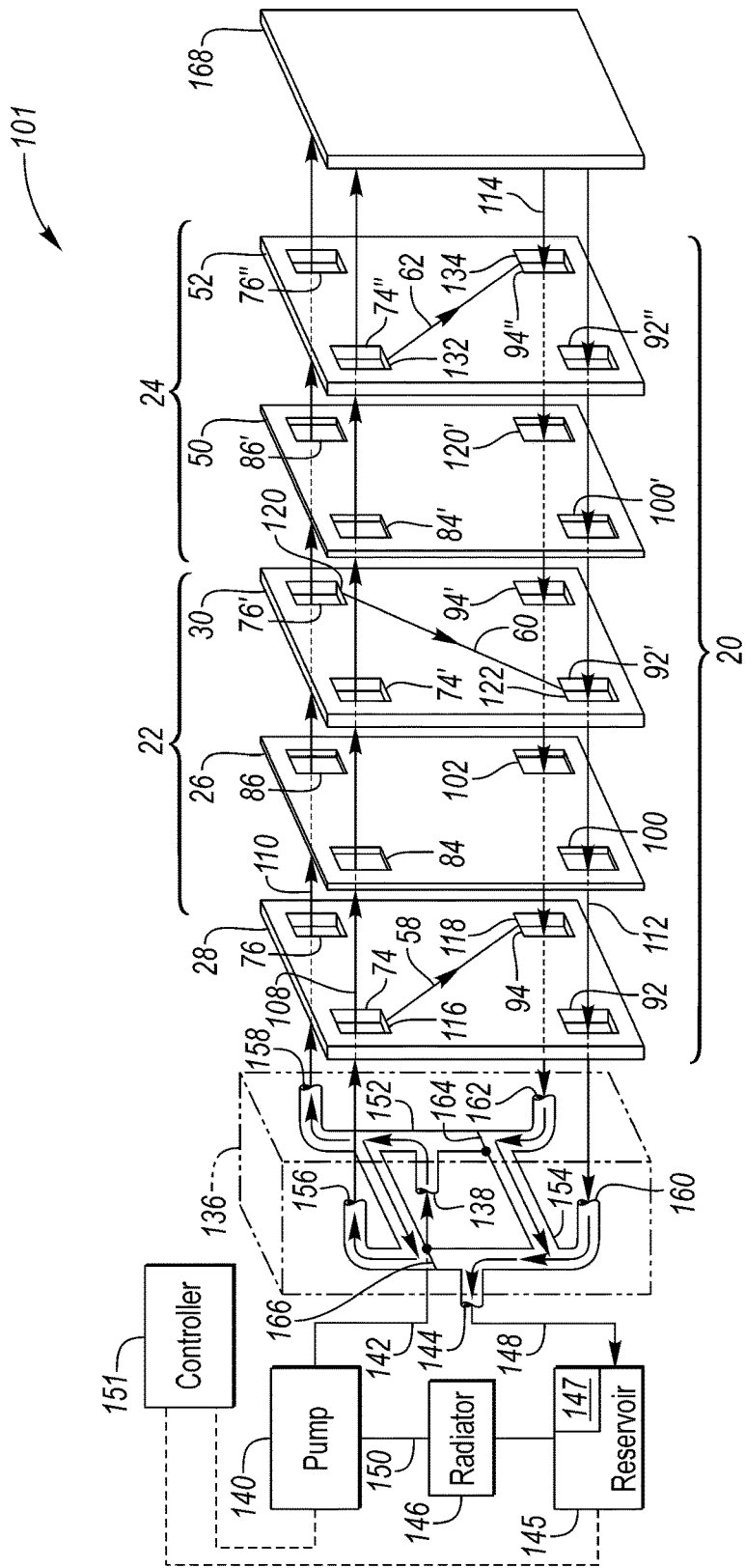
FIG. 4 is an exploded schematic of a thermal management system and fuel cell stack in normal operating condition.

Referring to FIG. 4, a thermal management system 101 is used to regulate the temperature of the fuel cell stack 20. The fuel cell stack 20 includes adjacent first and second cells 22, 24 each including an MEA 26, 50 sandwiched between one of the endplates 28, 52 and the bipolar plate 30. The first and second cells share the bipolar plate 30. When the first and second cells are assembled, the coolant headers 108, 110, 112 and 114 extend across the stack 20. The coolant headers are the lines that circulate coolant into and out of the stack 20. The coolant ports are not a separate component from the coolant headers, but rather are a segment of the header. Thus, the coolant headers are comprised of a plurality of coolant ports arranged together forming coolant tunnels that extend across the length of the stack 20. Gaskets or sealant may be used to form a seal between adjacent coolant ports.

The coolant channels 58 are in fluid communication with the first coolant header 108 via opening 116 and the fourth coolant header 114 via opening 118, and the coolant channels 60 are in fluid communication with the second coolant header 110 via opening 120 and the third coolant header 112 via opening 122. The cooling channels 62 are in fluid communication with the first coolant header 108 via opening 132 and the fourth coolant header 114 via opening 134. The direction of coolant flow within each of the channels is dictated by the flow directions of the headers.

A manifold 136 is attached to one end of the stack 20 and includes internal piping or channels that connect with each of the headers. The manifold 136 includes an inlet port 138 that receives pressurized coolant from a pump 140 via a high pressure supply line 142. The manifold 136 also includes an outlet port 144 connected to a radiator 146 via a low pressure return line 148. A reservoir 145 is in fluid communication with the lower pressure line 148 and includes a coolant temperature sensor 147. The pump 140 and the radiator 146 are interconnected via line 150. A vehicle controller 151 (such as the power train control module, fuel cell control module, or vehicle control system) may be electrically connected with various components of the system 101 to control the operation of the system.

The manifold includes four orifices 156, 158, 160 and 162 that each connects to one of the coolant headers. The orifices are in fluid communication with the inlet 138 and the outlet 144 via the internal piping within the manifold 136. The internal piping of the manifold 136 may include a pair of vertical pipes 152 that are in fluid communication with the inlet 138 and the outlet 144. A pair of horizontal pipes 154 interconnects between the vertical pipes 152. Each of the vertical pipes 152 includes an upper and lower 90° bend and a straight section terminating at one of the orifices. The internal piping may include valves for controlling the flow direction of the coolant headers. For example, the piping includes a first valve 164 and a second valve 166. By actuating the valves 164, 166 into different positions the flow directions within each of the headers can be changed. The valves within the manifold 136 cooperate in coordination to properly control the circulation of coolant within the system 101. The valves may be butterfly valves, spool valves, solenoid valves, electric two-way valves, etc. The valves may be electronically controlled valves that are in communication with the controller 151. Controller 151 may send a signal to each of the valves instructing the valves to open or close in order to switch the system 101 into different operating modes, such as normal operating mode and cold start mode. An endplate 168 is disposed on the other end of the stack. The endplate 168 seals the ports on plate 52 acting as a stopper, or dead end, for each of the headers.

The controller 151 generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data and stored within the memory. The controller 151 may communicate with other vehicle systems and controllers over one or more wired or wireless vehicle connections using common bus protocols (e.g., CAN and LIN).

Figure 5:
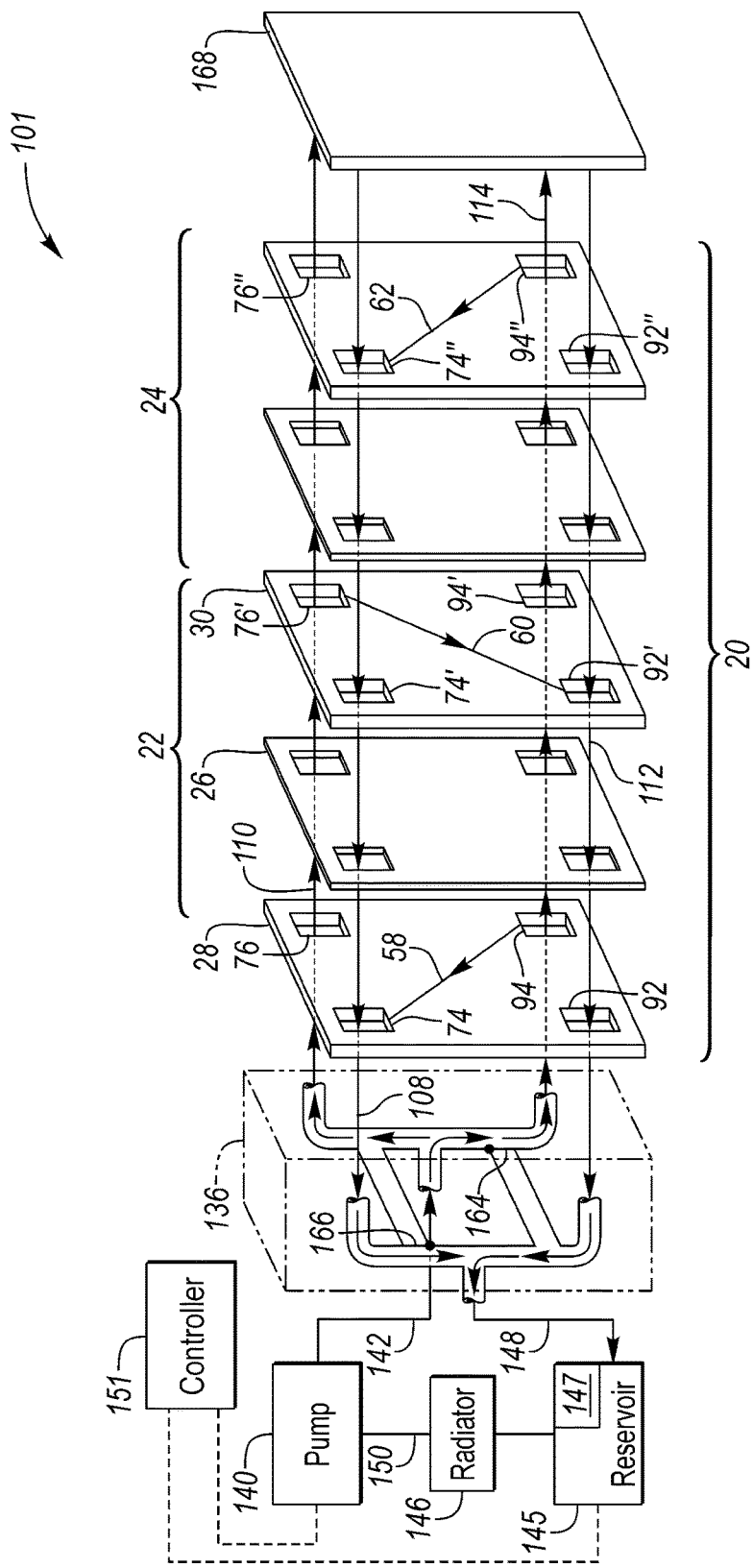
FIG. 5 is an exploded schematic of the thermal management system and fuel cell stack in cold start operating condition.

FIGS. 4 and 5 illustrate two different operating modes of the thermal management system 101. FIG. 4 illustrates the system 101 operating in a normal mode and FIG. 5 illustrates the system 101 operating in a cold start mode.

In FIG. 4, the valves 164, 166 are actuated such that the coolant headers 108 and 110 are supply headers and coolant headers 112 and 114 are return headers. When the headers have this flow configuration, the cooling channels 58 circulate fluid from port 74 to port 94 in a generally downward direction of flow, and the cooling channels 60 also have a generally downward direction of flow circulating fluid from port 76' to 92'.

In FIG. 5, the valves 164, 166 are actuated such that the coolant headers 110 and 114 are supply headers and coolant headers 108 and 112 are return headers. When the headers have this flow configuration, the cooling channels 58 circulate fluid from port 94 to port 74 in a generally upward direction and cooling channels 60 circulate fluid from port 76' to port 92' in a generally downward direction. This creates an alternating flow path along a length of the stack which helps to reduce hot and cold spots.

Figure 6:
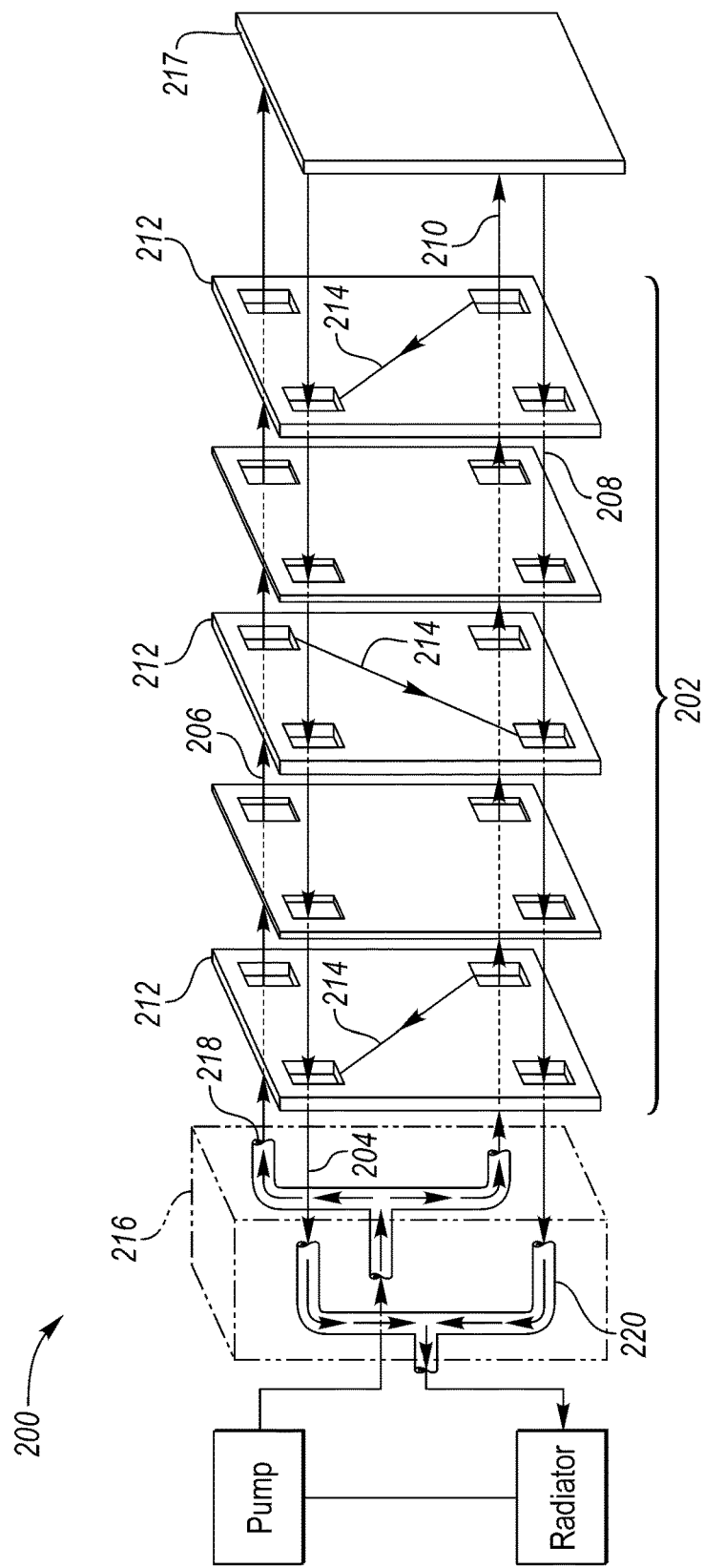
FIG. 6 is an exploded schematic of a thermal management system and fuel cell stack according to another embodiment.

Referring to FIG. 6, another thermal management system 200 includes a fuel cell stack 202 having four coolant headers (204, 206, 208 and 210), and a plurality of plates 212. Each of the plates includes fluid channels 214 in fluid communication with two of the four headers. Manifold 216 is disposed on an end of the stack 202 and include orifices 218 in fluid communication with a respective header. The manifold 216 is valueless: Therefore, the system 200 has only one operating mode that is determined by the fixed internal plumbing 220 within the manifold 216. In the illustrated embodiment, the manifold 216 causes the headers 204 and 208 to be return lines, and headers 206 and 210 to be supply lines, which cause the coolant channels 214 of adjacent plates to have alternating flow paths similar to the cold start mode of system 101 shown in FIG. 4. The fuel cell stack 202 may include an endplate 217 opposite the manifold 216.

Figure 7:
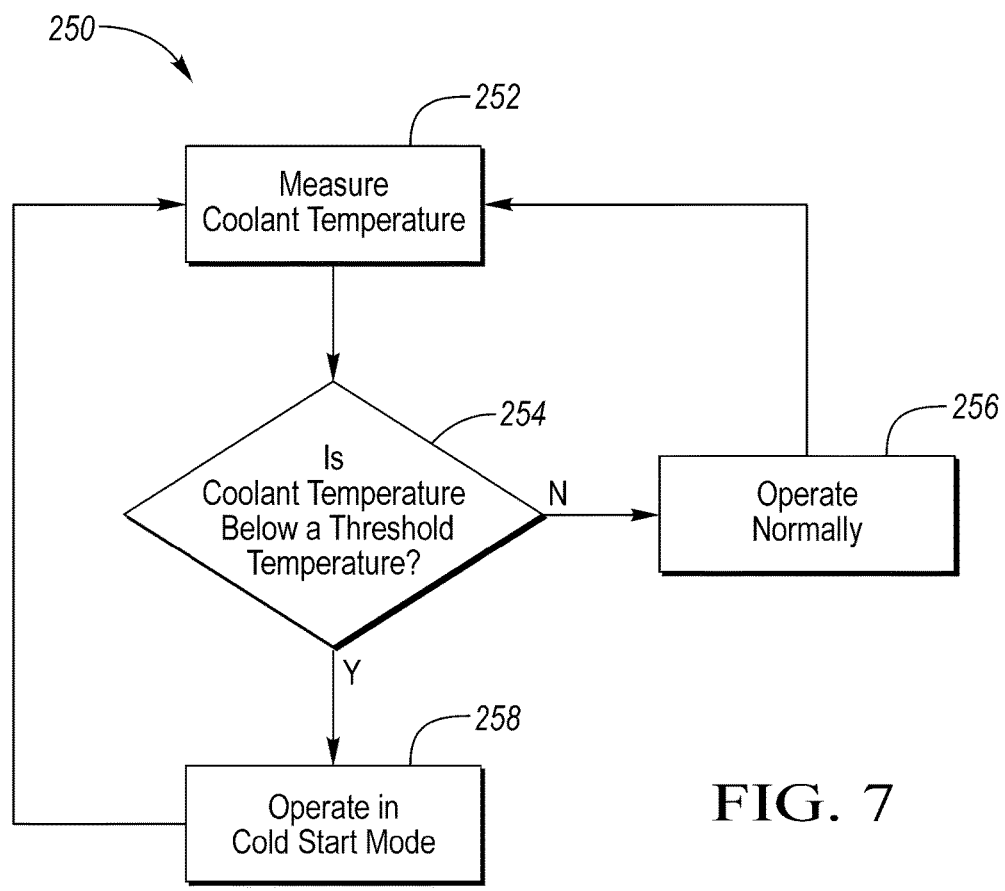
FIG. 7 is a flow chart for operating the thermal management system and fuel cell.

FIG. 7 illustrates a flow chart 250 for operating the system 101. The steps of the flow chart 250 may be carried out by one or more controllers, such as controller 151 from FIGS. 4 and 5. At step 252 the temperature of the coolant is determined. The temperature sensor 147 in the coolant reservoir 145 may measure the temperature of the coolant and send a coolant temperature signal to the controller 151. At step 254 the controller 151 compares the temperature of the coolant to a threshold temperature. For example, the threshold temperature may be 2 degrees C. If the temperature of the coolant is above the threshold, then control passes to step 256 and the controller instructs actuation of the valves in the manifold causing the system 100 to operate in normal operating mode. If at step 254 the system 101 is already in normal operating mode, the controller does not instruct actuation of the valves and the system continues operating normally. If the temperature of the coolant is at or below the threshold, then control passes to step 258 and the controller instructs actuation of the valves in the manifold causing the system 101 to operate in cold start mode.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A fuel cell assembly comprising:
a membrane electrode assembly sandwiched between first and second plates that each include opposing first and second regions that each define a first coolant header and a second coolant header, and in response to a cold-start mode, the first plate being configured to circulate coolant from the first region to the second region and the second plate being configured to circulate coolant from the second region to the first region.

2. The fuel cell assembly of claim 1 wherein, in the cold-start mode, the first coolant headers act as supply headers and the second coolant headers act as return headers.

3. The fuel cell assembly of claim 2 wherein each of the supply headers is configured to circulate coolant in a same direction and each of the return headers is configured to circulate coolant in a same direction.

4. The fuel cell assembly of claim 3 where the supply headers are configured to circulate coolant in a first direction and the return headers are configured to circulate coolant in a second direction that is opposite the first.

5. The fuel cell assembly of claim 1 further comprising at least one manifold attached to one of the first and second plates and in fluid communication with each of the headers, wherein the manifold includes valves having at least a first position in the cold-start mode and a second position in a mode other than the cold-start mode.

6. The fuel cell assembly of claim 5 wherein the manifold is configured such that, in response to the valves being in the first position, the first coolant header of the first region circulates coolant in a first direction and, in response to the valves being in the second position, the first coolant header of the first region circulates coolant in a second direction that is opposite the first direction.

7. The fuel cell assembly of claim 5 wherein the manifold further includes an inlet port connected to a high pressure line and an outlet port connected to a low pressure line.

8. The fuel cell assembly of claim 1 wherein the membrane electrode assembly (MEA) includes first and second regions, and each of the plates defines a pair of first and second ports in each of the first and second regions, and the MEA defines a pair of first and second ports in each of the first and second regions, wherein the first ports of first plate, the second plate and the MEA cooperate to collectively define the first coolant headers, and wherein the second ports of the first plate, the second plate and the MEA cooperate to collectively define the second coolant headers.

9. The fuel cell of claim 1 wherein the first plate further defines a first coolant channel in fluid communication with the first coolant header of the first region and the second coolant header of the second region, and the second plate further defines a second coolant channel in fluid communication with the second coolant header of the first region and the first coolant header of the second region.

10. The fuel cell of claim 9 wherein the first plate defines a longitudinal centerline, and the first coolant headers are located on one side of the longitudinal centerline and the second headers are located on the other side of the longitudinal centerline.

11. The fuel cell of claim 10 wherein the second plate defines a second longitudinal centerline, and the first coolant headers are located on one side of the second longitudinal centerline and the second headers are located on the other side of the second longitudinal centerline.

12. The fuel cell of claim 9 wherein the first coolant channel is not in fluid communication with the second coolant header of the first region.

13. The fuel cell of claim 12 wherein second coolant channel is not in fluid communication with the second coolant header of the second region.

14. The fuel cell of claim 9 further comprising a manifold defining orifices each coupled to one the coolant headers of the first plate, the manifold including a valve movable between a cold-start position and a normal position, wherein the manifold is configured such that coolant flows through the first coolant channel from the first coolant header of the first region to the second coolant header of the second region when the valve is in the cold-start position and coolant flows through the first coolant channel from the second coolant header of the second region to first coolant header of the first region when the valve is in the normal position.

15. The fuel cell of claim 14 wherein coolant flows through the second coolant channel from the first coolant header of the second region to the second coolant header of the first region when the valve is in the cold-start position and coolant flows through the second coolant channel from the first coolant header of the second region to the second coolant header of the first region when the valve is in the normal position.

16. The fuel cell assembly of claim 6 further comprising at least one controller in electronic communication with the valves, and programmed to, in response to coolant having a temperature below a threshold value, command actuation of the valves to the first position.

* * * * *